United States Patent [19]

Geen

[11] Patent Number: 4,606,637

[45] Date of Patent: Aug. 19, 1986

[54] DITHERED RING LASER GYROSCOPE WITH RESIDUAL LOCK-IN ERROR COMPENSATION

[75] Inventor: John A. Geen, Berkshire, England

[73] Assignee: British Aerospace Public Limited Company, London, England

[21] Appl. No.: 526,870

[22] Filed: Aug. 26, 1983

[30] Foreign Application Priority Data

Aug. 26, 1982 [GB] United Kingdom ............... 8224583

[51] Int. Cl.$^4$ ............................................. G01C 19/64
[52] U.S. Cl. .................................................. 356/350
[58] Field of Search ....................................... 356/350

[56] References Cited

U.S. PATENT DOCUMENTS 4,248,534 2/1981 Elbert .................................. 356/350
4,504,146 3/1985 Morgan ............................... 356/350

Primary Examiner—Vincent P. McGraw
Assistant Examiner—S. A. Turner
Attorney, Agent, or Firm—Cushman, Darby & Cushman

[57] ABSTRACT

A ring laser gyroscope has noise reduction means which removes or compensates for errors which result when a bias or dither is imparted to the gyroscope in order to reduce or avoid lock-in. In one embodiment the gyroscope has processing means (25) including two photodiodes (26,27) which are exposed to the fringe pattern of the gyroscope output beams and which, by the use of a Norton input operational amplifier (30) configured as an electronic integrator, produce a signal which is algebraically summed with the uncorrected gyroscope output signal to produce a corrected gyroscope output signal.

5 Claims, 5 Drawing Figures

DITHERED RING LASER GYROSCOPE WITH RESIDUAL LOCK-IN ERROR COMPENSATION

BACKGROUND OF THE INVENTION

This invention relates to ring laser gyroscopes, and is concerned with the removal or compensation of errors which result when a bias or so-called dither is imparted to the gyroscope in order to reduce or avoid a phenomenon known as "lock-in".

As is well known, a ring laser employs two beams of light which are propagated in opposite directions around the ring or so-called cavity. The cavity is typically of triangular or rectangular form and may be of a modular construction or an integral construction. In a modular ring laser, one limb or part thereof is formed by a laser which produces the contra-propagating beams of light which are transmitted to the remainder of the ring through Brewster angle windows. In an integral cavity, the limbs of the ring communicate directly with each other and the ring is filled with a lasing medium which produces the desired contra-propagating beams of light.

In an ideal ring laser, the frequency difference between the beams of light is zero when the ring is stationary but moves from zero when the ring is rotated about a sensitive axis extending at right angles to the plane of the ring. Thus, the frequency difference between the two contra-propagating beams of light is proportional to the angular rotation rate of the ring about the sensitive axis. Therefore, a ring laser is capable of functioning as a rate gyroscope. In practical ring lasers, however, there are many defects which degrade the performance and the majority of these are linked in some way to the amount of light that is lost in the contra-propagating beams of light traversing the ring. One of the most dominant, and hence troublesome, effects is lock-in which is caused by light scattered from each beam interacting with the opposite beam, thereby suppressing the frequency difference at low rotation rates, and making the frequency difference a non-linear function at higher rates.

In a ring laser gyroscope, the contra-propagating beams of light are directed around the ring by mirrors disposed at the transitions between adjacent limbs of the ring. Normally one of these mirrors is partially transmissive, whereby part of each beam passes therethrough to provide an output light beam, the two output light beams being combined to provide interference fringes which may be counted by a photo detector. The fringe count is directly proportional to the total angle through which the ring laser has turned, provided the two beams of light are completely uncoupled. The ratio of the fringe count per unit angle of rotation is known as the scale factor. As a result of lock-in, no fringes will occur up to the lock-in threshold and the scale factor will be non-linear for a range of rotational rates above the lock-in threshold. Both these phenomena seriously degrade the accuracy of the ring laser gyroscope at low angular rates.

One method of avoiding the lock-in problem is to impart a bias to the ring laser such that a non-reciprocal phase shift is introduced into the two contra-propagating light beams. Various biassing or dithering techniques have been proposed, including oscillating the entire ring laser at a small amplitude. With the latter arrangement it is preferable to employ some means for introducing a random phase shift of the beams to prevent systematic errors accumulating from the oscillation; perturbation of the dither is a convenient way of introducing this random component.

This method has many advantages. Specifically, it is capable of yielding ring laser gyroscopes with very stable low bias. However, it has the disadvantage of inducing a random noise component into the output of the ring laser gyroscope which can be a severe limitation in applications where the use of the ring laser gyroscope is of short duration. Such applications include the gyrocompassing alignment of an aircraft navigation system prior to take-off, and the guidance of missiles.

The noise is also a disadvantage in that it increases gyroscope test times and it reduces the advantages of the electro-optical techniques which are available for increasing the resolution of a ring laser gyroscope.

An aim of this invention is substantially to reduce the output noise of dithered ring laser gyroscopes, thereby increasing their short term accuracy.

SUMMARY OF THE INVENTION

According to the present invention a ring laser gyroscope comprises an assembly having a closed path formed therein around which, in use, two contra-rotating beams of light propagate, a plurality of mirrors operable to transmit the light beams around the path, at least one of the mirrors being partially transmissive so as to provide an output mirror for the light beams, means for imparting an oscillatory, non-reciprocal phase change to the light beams to reduce the lock-in errors thereof, means responsive to the light beams transmitted through an output mirror to produce an output signal of the gyroscope, noise reduction means also responsive to the light beams transmitted through an output mirror to provide an error signal representative of the noise content of the gyroscope output signal due to the non-reciprocal phase change imparted to the light beams, and combining means for algebraically summing the error signal with the uncorrected gyroscope output signal to provide a corrected gyroscope output signal, the noise reduction means comprising sensing means for providing a signal representative of an interference fringe of the two light beams, and integrating means for integrating that signal to provide said error signal.

The sensing means may comprise two photodetectors exposed to the sinusoidal waveform representing the fringe pattern, and the sensing means may additionally comprise a current mirror to which the outputs of the photodetectors are fed. In the preferred embodiment to be described, the current mirror and the integrating means are together constituted by a Norton input operational amplifier.

The output of a ring laser gyroscope is normally obtained in digital form, and the error signal is preferably also in digital form so that it can be combined with the uncorrected gyroscope output signal by digital techniques. In this case, the integrating means is conveniently included in an analogue-to-digital converter which may be a delta-sigma modulator, e.g. of the form disclosed in our co-pending British Patent Application No. (B.5030).

The photodetectors providing the signals representative of the interference fringe may be entirely separate from the photodetectors which are used to derive the uncorrected gyroscope output signal. Alternatively, the photodetectors providing the signal representative of the interference fringe may form certain photodetectors of an array of photodetectors from which the uncorrected gyroscope output signal is derived. This latter arrangement improves resolution which is particularly beneficial since the invention reduces or eliminates the noise in the gyroscope output signal, whereby full advantage can be taken of enhanced resolution.

BRIEF DESCRIPTION OF THE DRAWINGS

The invention will now be described in greater detail, and by way of example, with reference to the accompanying drawings, in which.

DESCRIPTION OF THE PREFERRED EMBODIMENTS

Figure 1:
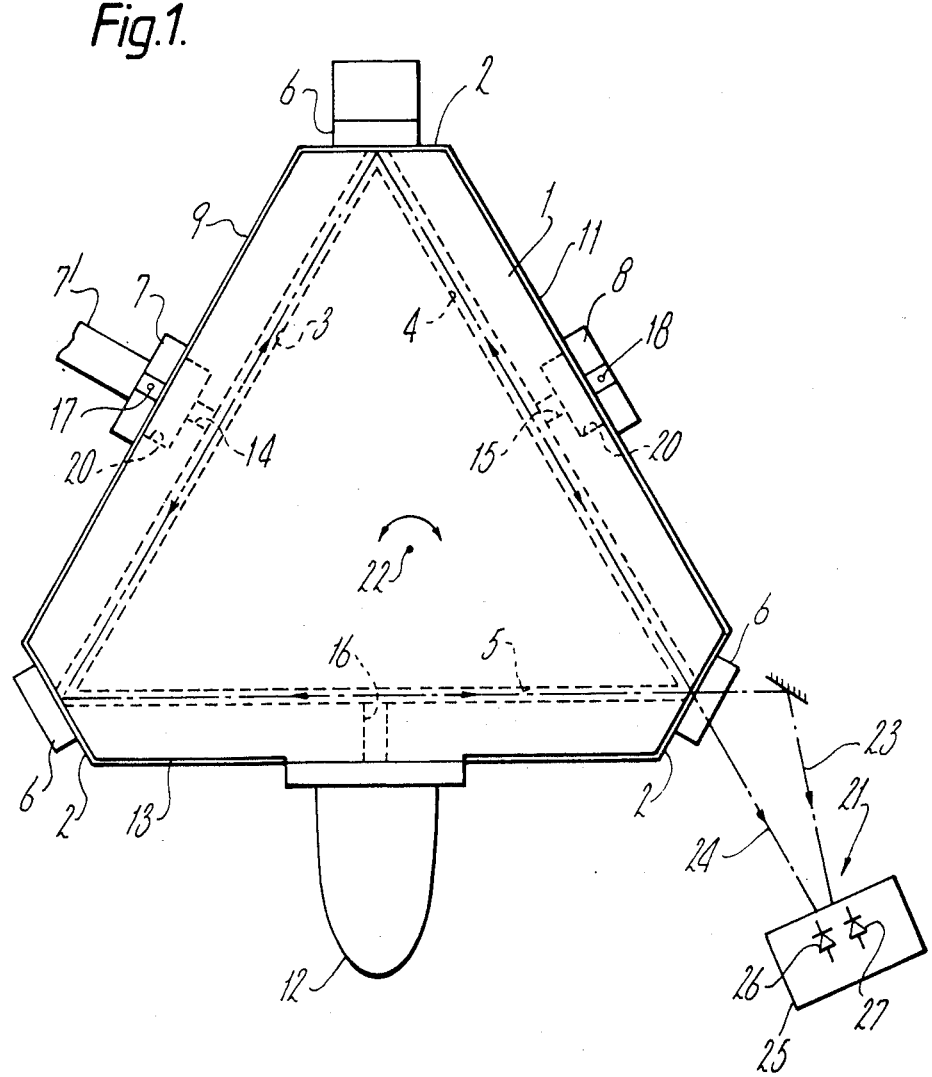
FIG. 1 is a schematic plan view of a ring laser gyroscope forming the preferred embodiment of the invention.

Referring to FIG. 1, the cavity of the laser gyroscope is constructed from a block 1 of a material which is non-metallic and has a low coefficient of expansion. A preferred material is that known under the trade name Zerodur. The block 1 is in the shape of an equilateral triangle, as seen in plan view, with the apices cut at right angles to the respective planar bisectors to provide planar mounting surfaces 2. The block 1 is drilled parallel to each side to provide three limbs 3, 4 and 5 which together form the so-called cavity of the laser gyroscope in which glow discharge or, more specifically, lasing takes place. The cavity is continuous by virtue of the limbs 3, 4 and 5 extending from one mounting surface 2 to another, whereby two limbs intersect at each surface 2. A mirror 6 is sealed to each surface 2.

Communicating with the cavity are two anodes 7 and 8 mounted along sides 9 and 11, respectively, of the block 1, and a cathode 12 mounted along the side 13 of the block. The anodes 7 and 8 and the cathode 12 are sealed in a gas-tight manner to the block 1, as are the mirrors 6, and communicate with the cavity through respective bores 14, 15 and 16 extending between the associated limbs 3, 4 and 5 and sides 9, 11 and 13. The bores 14 and 15 may each be counter-bored at 20 to maximise the surface areas of the anodes 7 and 8 which are exposed to the glow discharge in the cavity. The cavity is filled with an inert gas, typically a mixture of helium and neon and then sealed. Each anode 7 and 8 is provided with a threaded bore 17 and 18, respectively, to receive an electrical contact (not shown).

In order to minimise the problem of lock-in, a bias is imparted to the gyroscope using the dither method which oscillates the block 1 about the dither axis 22 of the gyroscope, which axis passes through the centre of gravity of the block 1 but which is offset from the geometric centre of the cavity. This mechanical dither may be imparted to the block 1 by the construction disclosed in our co-pending British Patent Application No. 81.32437.

During lasing, two contra-rotating beams of light propagate around the cavity, the light being reflected at the apices of the triangular cavity by the mirrors 6. One of the mirrors 6, shown at the lower right-hand corner of the block 1 in FIG. 1, in partially transmissive to the light beams, thereby providing out output mirror for the gyroscope. Accordingly, two light beams 23,24 emerge from the cavity and are combined to form interference fringes, and are then processed by processing means 25 to be described. The processing means 25 derive from the beams 23,24 an uncorrected gyroscope output signal by conventional means. In addition, the processing means 25 derive an error signal representative of the noise content of the gyroscope output signal due to the phase changes imparted to the light beams by the unwanted interactions between them, and combine this error signal with the uncorrected gyroscope output signal to provide a corrected gyroscope output signal. The mirror 6 shown at the top of FIG. 1 is fitted with a piezoelectric transducer in order to adjust the path length of the cavity in a conventional manner.

Before describing the various forms of processing means 25 shown in FIGS. 2 to 5, there follows a theoretical analysis of the signal content of the output of a ring laser gyroscope.

The output of a ring laser gyroscope is given by $$\psi_\tau - \psi_o = a\tau + b \int_o^\tau f(t)\, dt + c \int_o^\tau \sin \psi\, dt$$

where $\psi$ is the relative phase angle of the counter-rotating light beams, chosen for simplicity with respect to that angle which eliminates a constant from the argument of the sin $\psi$ term.

$\psi_\tau$ is $\psi$ at time $t=\tau$ $\psi_o$ is $\psi$ at time $t=o$ a is the externally impressed rate multiplied by the gyro transfer function.

b is the peak value of dither rate multiplied by the gyro transfer function.

c is the locking threshold of the ring laser gyroscope multiplied by the gyro transfer function.

f(t) is the normalised dither function comprising a large periodic component and a small random component.

The direct contribution of f(t) to the noise output is cancelled by optically compensating the dither motion, a technique well known to ring laser gyroscope manufacturers. This leaves a residual error term $$C \int_o^\tau \sin \psi\, dt$$

which is the source of the troublesome noise output.

The noise may be compensated by estimating the error term and continuously subtracting it from the gyro output.

The present invention relies on the fact that the two beams of a ring laser gyroscope can be combined to form an interference pattern in space, the intensity of which over various small spatial areas may be sensed by photosensitive means to give an electrical output in the form I[sin ($\psi+\theta$)+$\epsilon$] where I is a scaling factor, $\theta$ is an offset angle dependent on the spatial position of the transducer, and $\epsilon$ is an offset which is dependent on transducer imperfections, on inequality of the intensities of the two beam components extracted from the laser cavity, and on stray light.

The term I will generally be a constant for a well constructed ring laser gyroscope but will vary from gyro to gyro. The term $\epsilon$ will usually be unstable because of the temperature dependence of transducers, in particular the leakage currents of photodiodes and phototransistors. The term $\theta$ will be stable in a well constructed gyro, this being an essential condition for the usual output sensing which also involves an interference pattern. The term $\theta$ may be adjusted during manufacture using the techniques well known to those skilled in the alignment of optical components of ring laser gyroscopes.

If the interference pattern is formed on two matched transducers, not too distantly spaced from each other, (a split photodiode is an example of such a transducer pair), and the outputs are differenced, then the unstable term $\epsilon$ will be cancelled and the remaining term may be integrated with respect to time to yield an estimate of the error term, as described in the following.

Let the phase difference resulting from the spatial separation of the two transducers be $2\alpha$. The angle $\alpha$ need not, and will not generally be, reproduceable from assembly to assembly but will be constant for a given assembly.

Also, let the gain factor of the integrator be $A/C$ when the output of the integrator will be:

$$S(t) = \frac{AI}{C} \int [\sin(\psi + \theta + \alpha) + \epsilon - \sin(\psi + \theta - \alpha) - \epsilon]\, dt$$

$$= \frac{2AI}{C} \sin(-\alpha) \int \cos(\psi + \theta)\, dt$$

$$= \frac{2AI}{C} \sin(-\alpha) \cos\theta \int \cos\psi\, dt + \frac{2AI}{C} \sin\alpha \sin\theta \int \sin\psi\, dt$$

The last of these terms is directly proportional to the error term and in order to cancel the gyro output noise it needs to be subtracted in isolation, correct polarity and in correct proportion from the gyro output.

A procedure to achieve this, given subtraction means, is to adjust $\theta$ during the optical alignment of the gyro and alternately vary A and $\theta$ in an iterative adjustment to achieve a minimum noise output from the gyro. At the correct alignment point $\theta = \pm n\pi/2$, n being an odd number. Then, $\cos\theta = 0$, isolating the last term, and $\sin\theta = \pm 1$, whichever gives the correct polarity. The adjustment of A scales $2AI \sin\alpha/C$ to be equivalent to c in the output phase processing, or a submultiple of c in a resolution enhanced system.

Clearly, a marked reduction of noise is possible for alignments which yield $\theta$ values close to the ideal even though $\theta = \pm n\pi/2$ may not be exactly achievable.

The process of adjustment is only economical if the operator performing it has a rapid means of assessing the noise output of the gyro. A number of special equipments are possible to provide this assessment, but a particularly convenient means is by spectral analysis. Commercial spectrum analysers are readily available and function very rapidly by fast Fourier transform methods. If the frequency spectrum of the output of the laser gyro at a constant impressed rate is observed, the spectral line or line splitting corresponding to that rate is broadened in proportion to the noise and gives a rapid visual indication of the noise output. The rotation of the Earth provides a convenient source of very stable rate.

Figure 2:
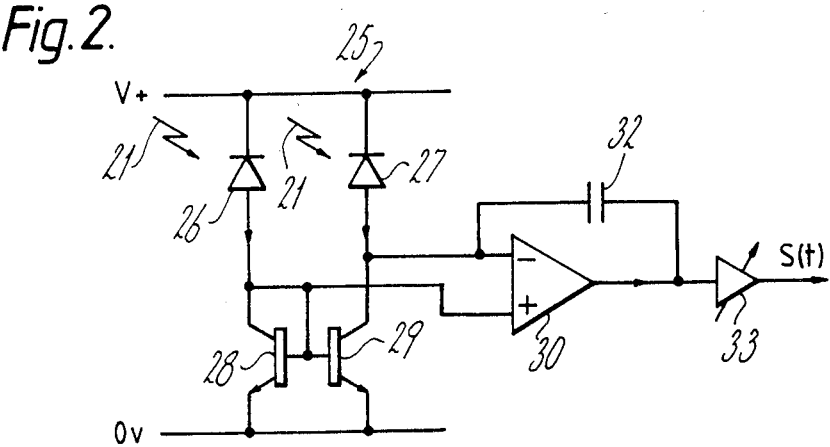
FIGS. 2 to 5 are circuit diagrams showing four alternative signal processing circuits which may be used in the ring laser gyroscope of FIG. 1, similar components in FIGS. 2 to 5 being given the same reference numerals.

The physical realisation of the techniques can be made simple and inexpensive. An example is shown in FIG. 2 of the accompanying drawings. In FIG. 2, the processing means 25 include two matched photodiodes 26, 27, preferably segments on a single semi-conductor die. It will be appreciated that the photodiodes 26, 27 are illuminated by the interference pattern 21 of the beams 23, 24. The photodiodes 26, 27 are connected to respective precision matched transistors 28, 29, again most conveniently achieved by fabrication of both on a single die. The collectors of the transistors 28, 29 are connected to respective inputs of an operational amplifier 30 with low differential input current. An integrating capacitor 32 is connected across the output and one input of the amplifier 30. The output of the amplifier 30 is connected to a variable gain circuit 33.

The transistors 28, 29 form a current mirror and they may be combined with the amplifier 30 on a single die to form a so-called Norton input operational amplifier. Such Norton amplifiers are readily available commercial items and enable economies in manufacture of the scheme. The operational amplifier 30 holds the voltage differential between its positive and negative input terminals at zero so that the voltage on its output is due solely to the current supplied to the capacitor 32 to charge the same, which current is the difference current from the current mirror, i.e. the difference between the current flowing in the photodiodes 26 and 27. The differential current is not passed through the operational amplifier due to the high input resistance thereof. Thus, the output of the operational amplifier 30 is the integral, with respect to time, of the current supplied to the capacitor 37.

The current output from the photodiode 26 (i.e. $I \sin(\psi+\theta+\alpha)+\epsilon$) is mirrored at the collector of the transistor 29 so that the difference between that current and the current from the photodiode 27 flows to the inverting input of the amplifier 30. The action of the amplifier 30 is to cancel that current by an equal and opposite current flowing through the capacitor 32 to the inverting input, thereby maintaining the inverting and non-inverting inputs at nearly the same potential. The result is accumulation of charge, Q, on C given by $$Q = I\int[\sin(\psi+\theta+\alpha) - \sin(\psi+\theta-\alpha)]\, dt$$

and a corresponding change of potential Q/C at the output of the amplifier 30. Thus, the function S(t) is generated after the variable gain circuit 33, the gain of which is designated A and which may be simple potentiometer.

To reduce any errors from bias currents the non-inverting input of the amplifier 30 is returned to the junction of the photodiode 26 and the transistor 28, which means that the output is referred to the potential of that junction. If a processing scheme subsequent to the integrator is chosen such that it is necessary to refer S(t) to zero volts then the non-inverting input of the amplifier 30 may be returned to zero volts instead of the collector of the transistor 28. In this case, the constraint of the amplifier 30 is that it should have low input bias currents rather than a low input offset current.

In the simple scheme of FIG. 2, the integrator means (formed by the amplifier 30 and the capacitor 32) would eventually saturate as a result of the inevitable small input offsets of a practical assembly. To prevent this, the very low frequency response of the integrator means would need to be limited and there would be a corresponding failure to compensate very low frequency components of the noise. This disadvantage may be overcome using a reset technique as disclosed hereinafter.

The analogue error or correction signal S(t) is combined with the uncorrected gyroscope output signal to form a corrected gyroscope output signal. The uncorrected gyroscope output signal is obtained from the beams 23, 24 in the processing means 25 by conventional techniques.

The output of a ring laser gyroscope is normally obtained in digital form so the easiest means for subtracting the error or correction signal from the uncorrected output signal involves digital techniques. When interfacing with a digital system it is convenient to use the integrator as part of an analogue-to-digital (A/D) converter rather than perform a separate A/D conversion on the function S(t). In addition to offering a reduction in cost this has two technical advantages.

First, the random walk of the ring laser gyroscope output is not theoretically bounded so there is potentially a problem with the dynamic range of the integrator. This is overcome by configuring the integrator as part of a reset integrator A/D converter.

Second, the bias of the A/D conversion becomes effectively a gyro bias so it is necessary to convert with a very stable and, preferably, small bias. The lowest bias A/D converters of current technology are based on integrating techniques, notably converters based on the delta-sigma modulation principle (quantisers), such as disclosed in our co-pending British Patent Application No. 8224585.

Figure 3:
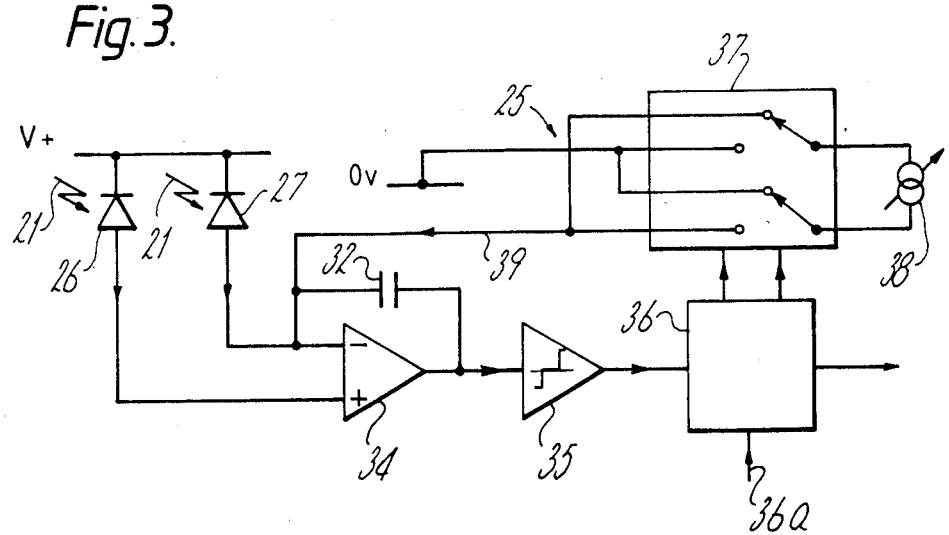

FIG. 3 illustrates one of the possible ways of achieving this and includes a simple A/D converter. In FIG. 3, the photodiodes 26, 27 are connected to a Norton amplifier 34, equivalent to the transistors 28, 29 and the amplifier 30 of FIG. 2. The output of the Norton amplifier 34 is fed to a window comparator 35 which in turn is connected to a processing and switch control logic circuit 36 having a clock input 36a. The logic circuit 36 controls switches 37 connected to an adjustable current source 38. The output of the circuit 36 is a digital error or correction signal which is digitally combined with the uncorrected digital output signal of the gyroscope, this latter signal being obtained (in the processing means 25) from the beams 23, 24 by conventional techniques as already mentioned.

The switches 37 in FIG. 3 are dual analogue changeover-switches and are independently controllable by the logic circuit 36 so that a positive, negative or zero current may be fed back on a lead 39 to the integrator means (formed by the amplifier 34 and the capacitor 32) for a defined period of time. The positive and negative currents should be equal to minimise the bias of the conversion. Defined quantities of charge (or quanta) are fed back as necessary to reset the output of the integrator means within the aperture of the window comparator 35. The digital error or correction signal bears a one-to-one relationship to these quanta and is, therefore, a representation of the integral of the difference current fed to the Norton amplifier 34. A notable feature of the circuit is that the overall gain is determined by the value of the feedback quantum and it may, therefore, be more convenient to vary the gain by adjusting the current source 38, as indicated.

Figure 4:
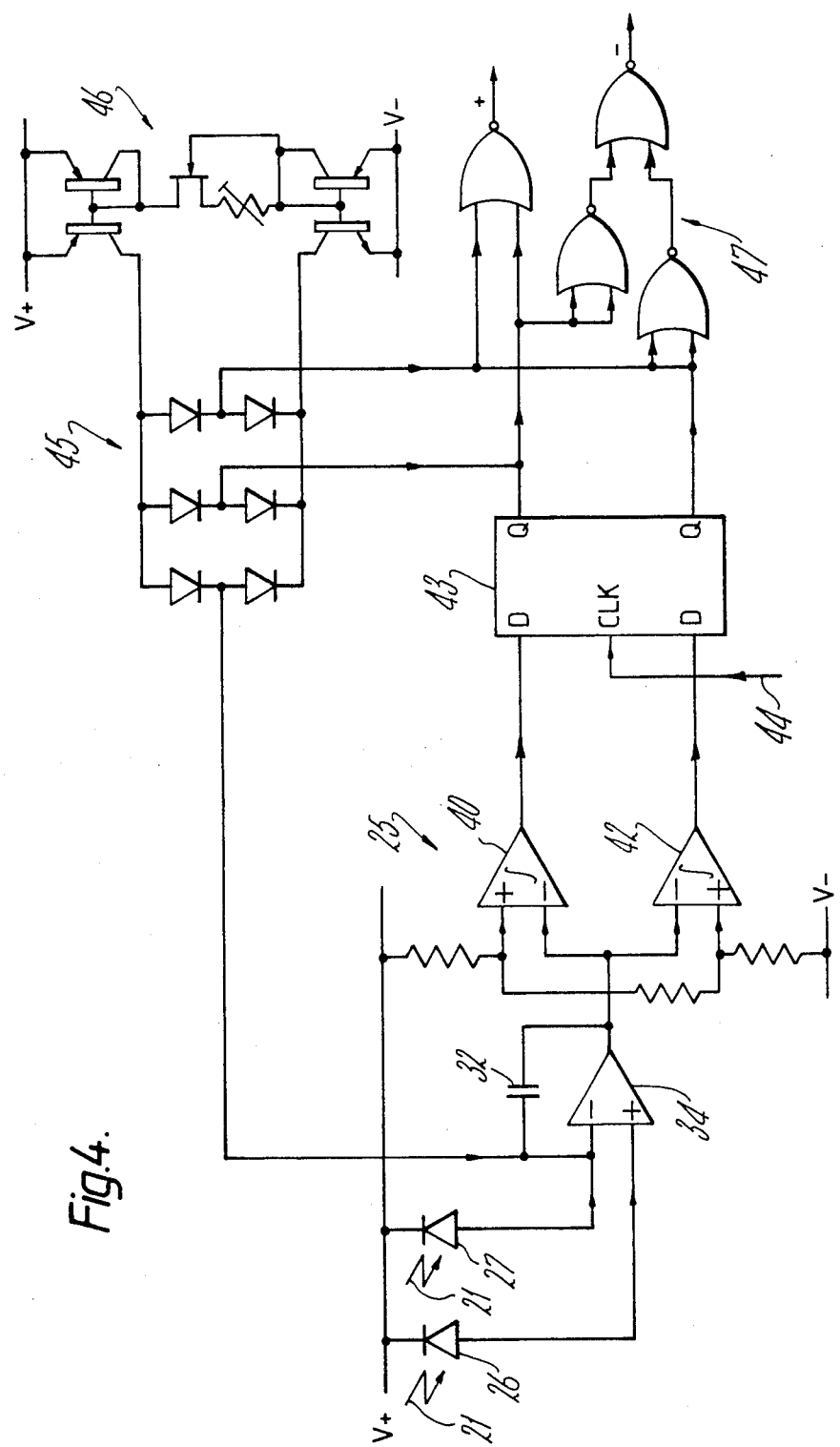

The circuit of FIG. 4 works on similar principles to those of FIG. 3. However, in FIG. 4 the amplifier 34 is connected to two comparators 40, 42 which are connected to a dual latch 43 operating between V+ and V−. The latch (forming the feedback logic circuit) is clocked on a lead 44 by the dither drive circuits. This is an advantageous, but not essential, refinement. Clocking at the dither rate causes the contribution of any dither motion not compensated optically to cancel by integration over a dither cycle and it does not, therefore, have to be handled by the A/D conversion and subsequent circuits. In particular, it reduces the necessary size of feedback quantum needed in cases where the optical compensation is far from perfect. This enables simpler, inexpensive circuitry to be used for switch driving and current sourcing.

The latch 43 controls a three-state diode switch 45 fed by an adjustable bipolar current source 46. Digital correction pulses are obtained at the two outputs of a series for four NOR gates 47.

In a digital system such as that described, the correction quanta may freely be varied so that they no longer correspond to whole rotations of the relative phase vector. In particular, they may be matched to that fraction of a rotation made available from a resolution enhancing system such as that described in co-pending British Patent Application No. 8224584 and thereby further improve the short term accuracy.

Figure 5:
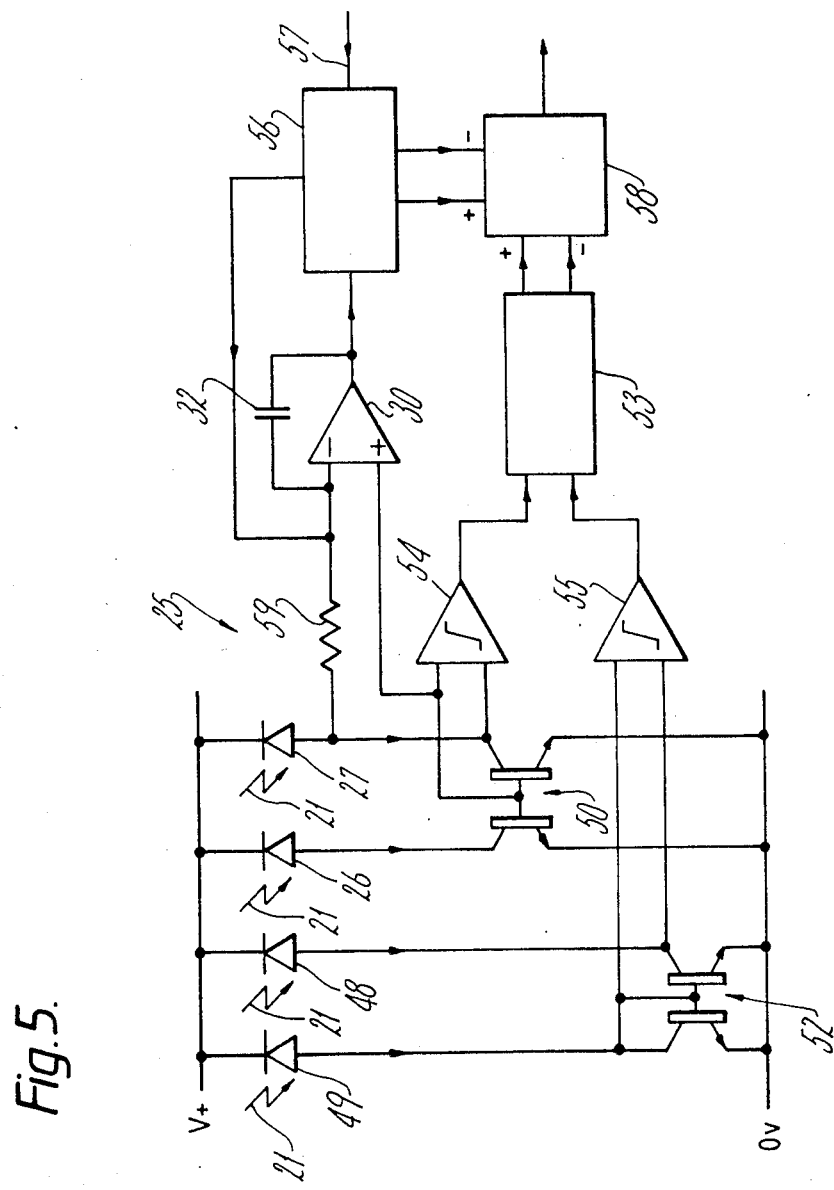

A further economy may be effected by using the photodiodes and matched transistor pair of the noise reducing circuit for part of a resolution enhancing circuit. In FIG. 5 the necessary logic signals for part of a resolution enhancing circuit are obtained from the noise reducing circuit by sensing the polarity of the analogue current difference between the sensors. This form of output processing retains the advantage of using differential sensor arrays in that the unstable offset in sensor output is cancelled directly, enabling the frequency response of the system to be continued down to d.c. This enables the system to function at very low gyro output rates even when the optical compensation is perfectly efficient.

In FIG. 5, the photodiodes 26, 27 form two of an array of four photodiodes, the remaining two of which are indicated at 48 and 49. The photodiodes 26, 27, 48, 49 form a linear photodiode array covering half a wavelength of the interference pattern. The outputs of the photodiode pair 26, 27 are fed to a first matched transistor pair 50, and the outputs of the photodiode pair 48, 49 are fed to a second matched transistor pair 52. Pulses representative of the uncorrected gyroscope output signal are obtained at the output of an output processing logic 53 which is connected to the respective transistor pairs 50, 52 by comparators 54, 55.

The pulses representative of the error or correction signal are obtained from a reset current circuit 56 clocked at 57, the correction pulses being combined with the uncorrected pulsed signal in a digital combiner 58. The circuit 56 derives the correction signal from the transistor pair 50 through a current sensing resistor 59 and the amplifier 30 and capacitor 32.

There is clearly sufficient information in the outputs of the two comparators 54, 55 to define the position of the interference pattern to quarter of a wavelength and hence the relative phase vector within a $\pi/2$ range. That is to say, the outputs of the two transistor pairs 50 and 52 are indicative of the amplitude of the movement of the interference waveform, and its direction, as disclosed in detail in our co-pending British Patent Application No. (B.5044).

Although the invention has been described applied to a ring laser gyroscope having an integral cavity (i.e. in which the casing medium occupies a continuous cavity in the form of an endless path within the block 1), the invention may be applied to a laser gyroscope having a modular cavity in which the lasing medium is confined to part of the endless light path within the block 1.

The laser gyroscope may be electrically, rather than mechanically, dithered to prevent lock-in, the resulting errors being reduced or eliminated in the same way as previously described.

I claim:

1. A dithered ring-laser gyroscope wherein an oscillatory non-reciprocal phase change is imparted to the clockwise and counterclockwise components of the gyroscope laser beam to reduce lock-in errors of the rotation-sensitive output signal of the gyroscope, the gyroscope comprising residual lock-in error compensating means which includes:

receiving means coupled to the optical cavity of the gyroscope for receiving and combining respective portions of said beam components to form an interference fringe pattern;

two photo-sensors coupled to said receiving means for forming respective output signals indicative of the fringe intensity;

comparator means connected to said photo-sensors for forming a difference signal indicative of the difference between the photo-sensor output signals;

integrating means connected to the comparator means for integrating said difference signal with respect to time; and combining means connected to the integrating means and operable for algebraically summing the integrated difference signal from the integrating means with said rotation sensitive gyroscope output signal to form a compensated gyroscope output signal containing at least reduced residual lock-in errors.

2. A dithered ring laser gyroscope according to claim 1, wherein said two photo-sensors comprise two photo-sensitive diodes which are supported by said receiving means closely adjacent one to the other and which have been selected to have substantially similar output signal versus temperature characteristics, and wherein said comparator means comprises two matched transistors having their collector terminals connected to respective ones of the photo-sensitive diodes and their base terminals connected to each other and to the collector terminal of one of the transistors whereby there appears at the collector terminal of the other transistor a signal indicative of the difference between the output currents supplied by the diodes.

3. A dithered ring laser gyroscope according to claim 1, wherein said integrating means comprises analog-to-digital converter means connected to said comparator means for forming ditigised samples of said difference signal, and summing means connected to the analog-to-digital conversion means for integrating said samples.

4. A dithered ring laser gyroscope according to claim 1, wherein said integrating means comprises:

capacitor means connected to said comparator means for accumulating an electrical charge representating the time integrated value of the said difference signal;

threshold sensing means connected to said capacitor means and operable for sensing equalities between said time integrated value and predetermined positive and negative threshold values;

positive and negative current supply means connected to said threshold sensing means and said capacitor means for being controlled by the logic means to contribute predetermined charge quanta to the charge accumulated by the capacitor means.

5. A dithered ring laser gyroscope wherein an oscillatory non-reciprocal phase change is imparted to the clockwise and counter-clockwise components of the laser beam to reduce lock-in errors thereof, the gyroscope comprising:

receiving means coupled to the optical cavity of the gyroscope for receiving and combining respective portion of said beam components to produce an interference pattern which moves relative to the gyroscope in response to rotation of the gyroscope about its sensitive axis;

a plurality of pairs of adjacent photo-sensors supported by the receiving means for forming signals indicative of the fringe intensities each side or respective portions of a single half-cycle of the fringe waveform for thereby resolving movement of the fringe pattern to a fractional portion of said half-cycle;

first comparator means connected to the photo-sensors for forming difference polarity signals indicative of the polarities of the differences between the signals from respective photo-sensor pairs;

first logic means connected to the first comparator means for forming first pulses each indicative of a movement of said fringe pattern through a said fractional portion of a fringe pattern half-cycle;

second comparator means connected to one of said photo-sensor pairs for forming a signal indicative of the difference between the signals from that photo-sensor pair;

integrating means for integrating the difference signal from the second comparator means with respect to time;

second logic means connected to the integrating means for forming second pulses each indicative of a predetermined quantum change of the time integrated value of said difference signal; and combining means connected to the first and second logic means for forming a residual lock-in error compensated gyroscope output signal comprising the algebraic sum of the first and second pulses.

* * * * *